Figure 2A:
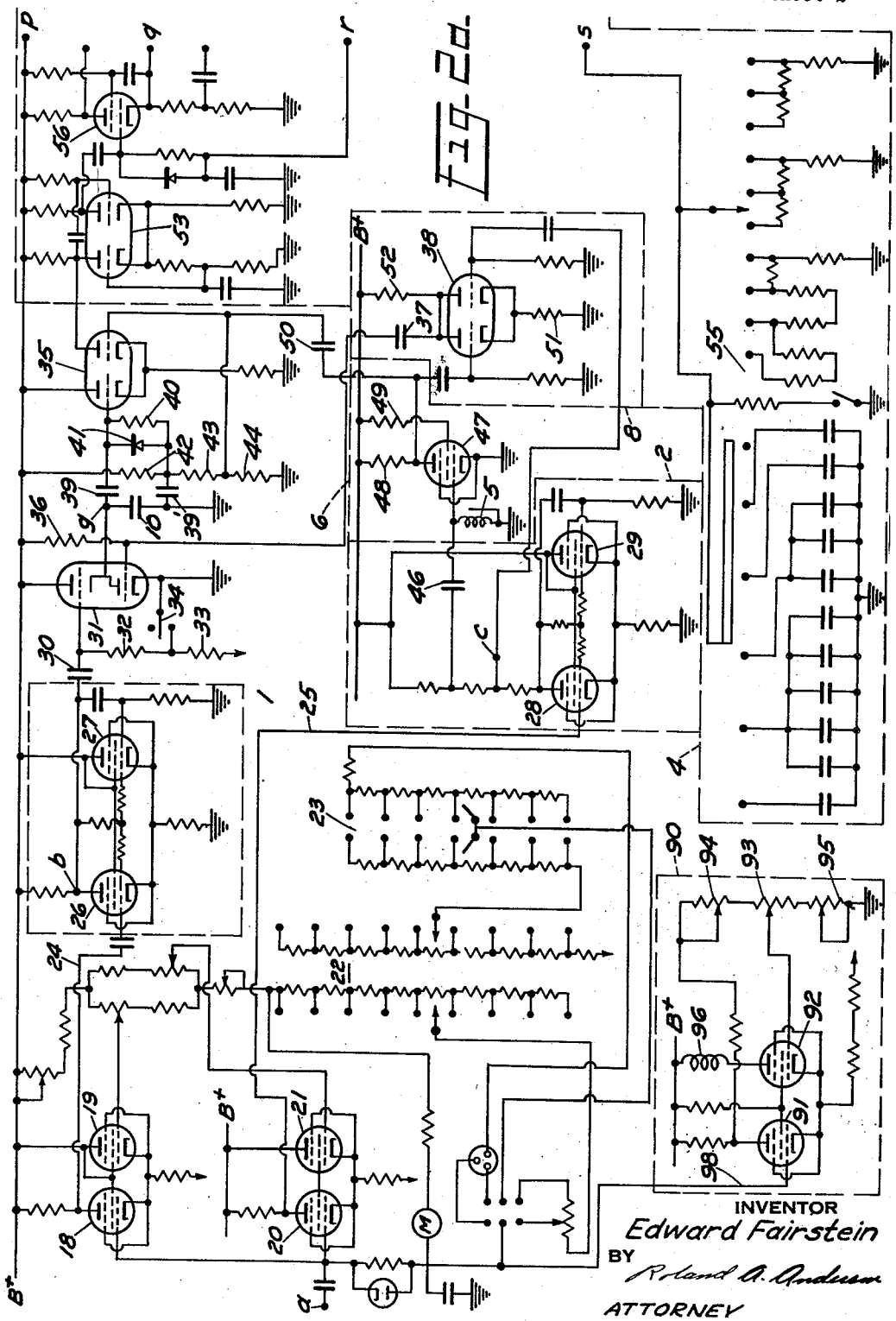

Nov. 9, 1954   E. FAIRSTEIN   2,694,146
PULSE ANALYZER
Filed June 12, 1951   4 Sheets-Sheet 1
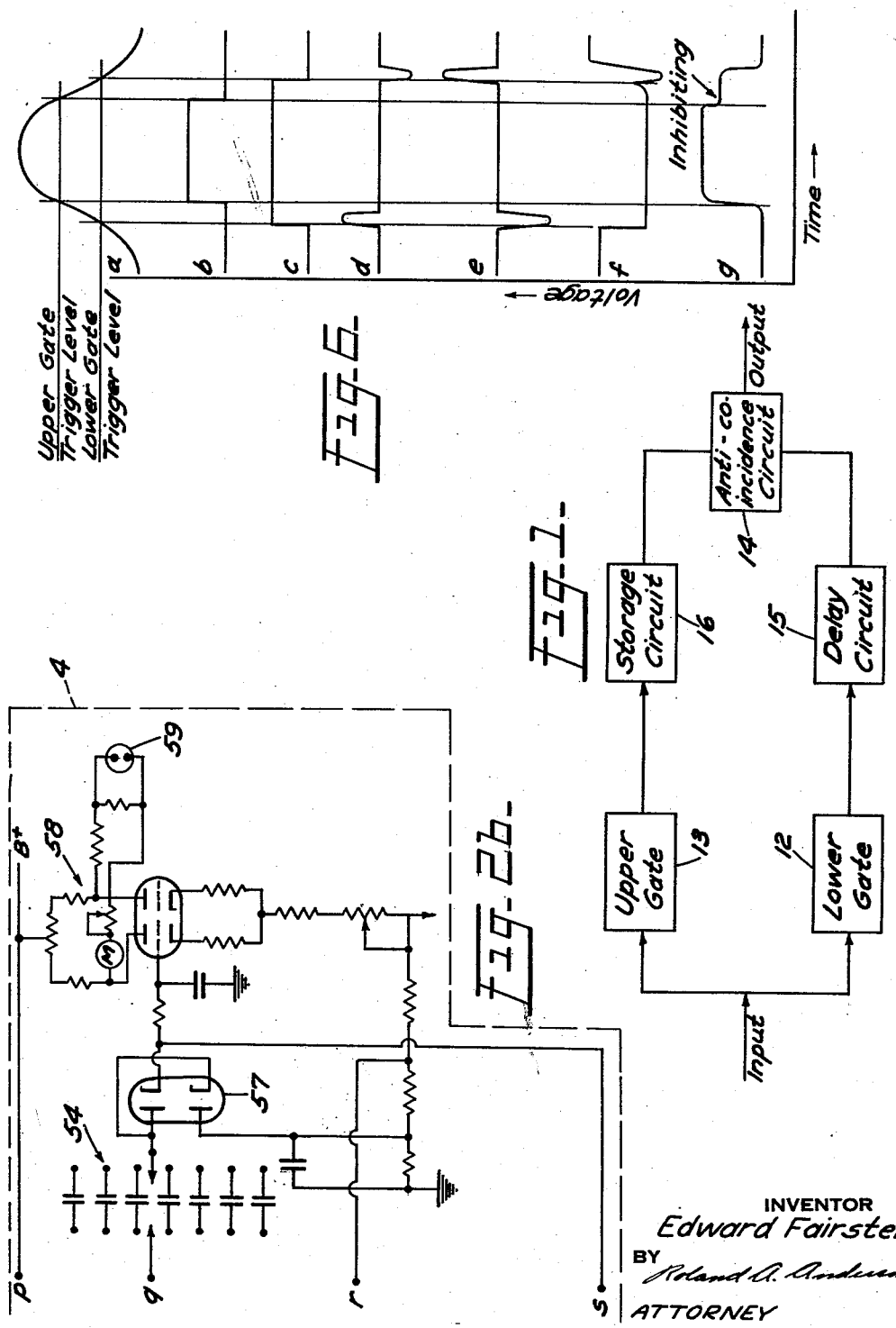
INVENTOR
Edward Fairstein
BY
Roland A. Anderson
ATTORNEY Nov. 9, 1954

E. FAIRSTEIN
PULSE ANALYZER 2,694,146

Filed June 12, 1951

4 Sheets-Sheet 2

INVENTOR
Edward Fairstein
BY
Roland A. Anderson
ATTORNEY

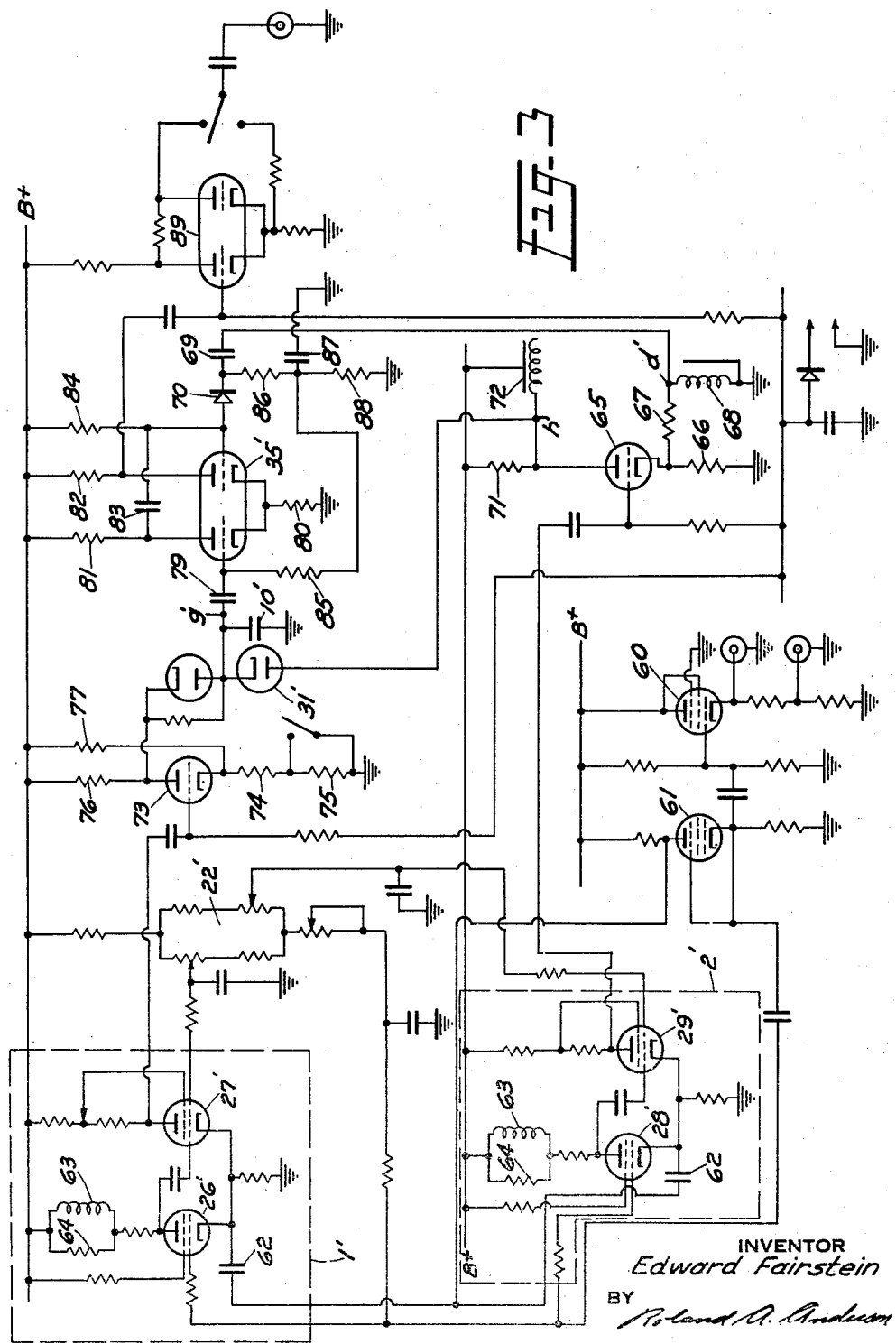

Nov. 9, 1954   E. FAIRSTEIN   2,694,146
PULSE ANALYZER
Filed June 12, 1951   4 Sheets-Sheet 4
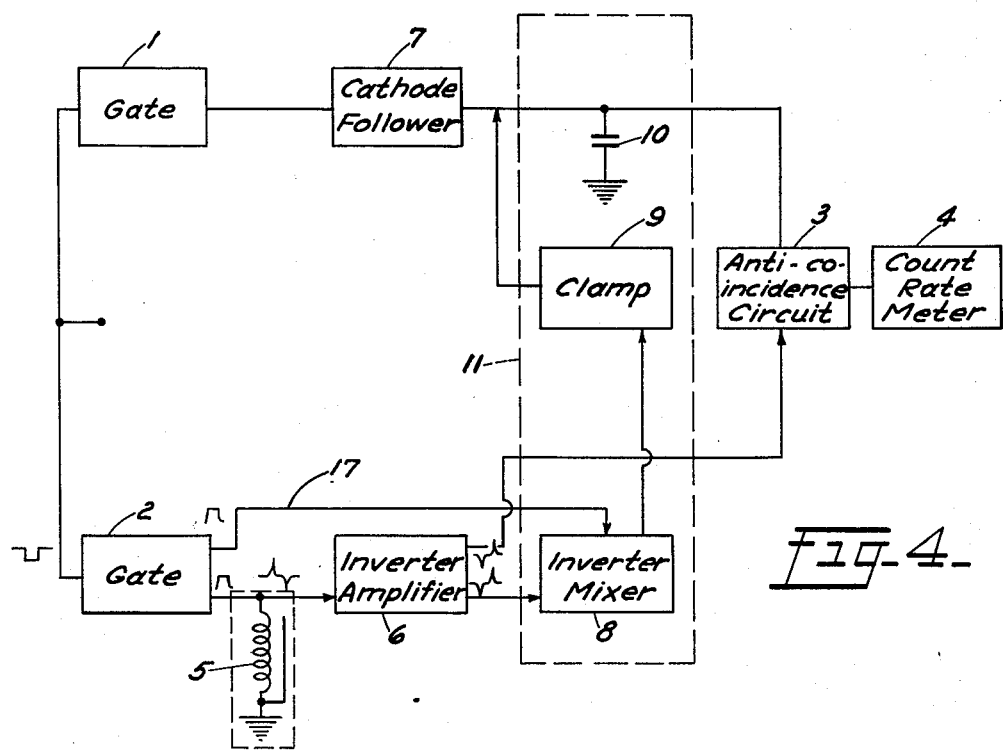
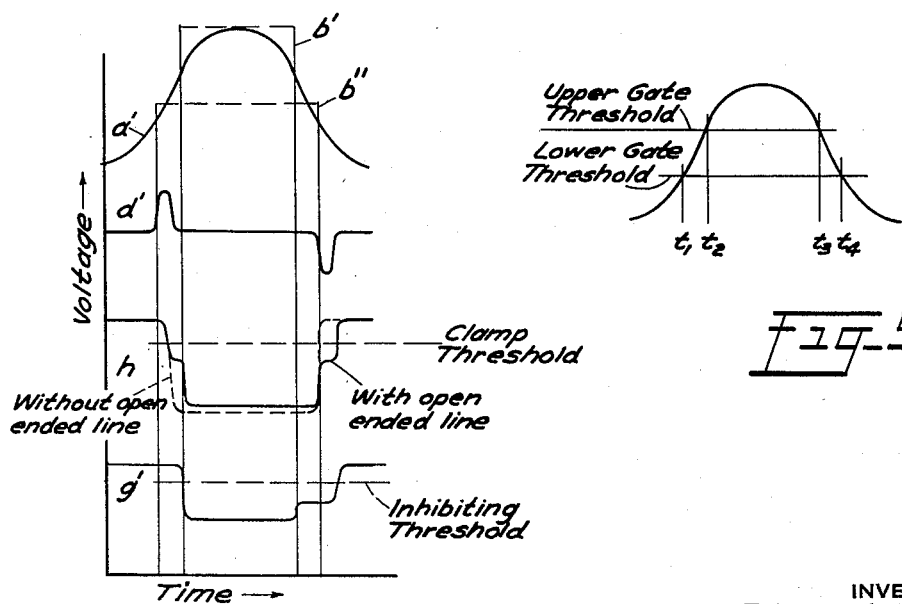
INVENTOR
Edward Fairstein
BY
ATTORNEY

United States Patent Office 2,694,146
Patented Nov. 9, 1954

2,694,146

PULSE ANALYZER

Edward Fairstein, Oak Ridge, Tenn., assignor to the United States of America as represented by the United States Atomic Energy Commission Application June 12, 1951, Serial No. 231,187

6 Claims. (Cl. 250—27)

My invention relates to pulse height distribution analyzers and more particularly to a differential-integral pulse height analyzer for fast operation, and is an improvement over the system of the co-pending application of Parsons, S. N. 53,794.

Heretofore, in the prior art, it has generally been the practice to employ a differential-integral pulse height analyzer to determine the alpha spectra. Such systems customarily employed a pair of discriminator channels operated at different threshold potentials to define a slit which passed pulses within the desired range of magnitudes. To accomplish this, a transformer was usually provided for the anti-coincidence circuit, and proved to be sufficiently rapid in its response for the alpha spectra. Since the transformer has a slow response, the difference in response times of the two channels did not adversely affect the operation of the system. Such a system generally employed univibrators as discriminators in order to produce pulses of sufficient length to operate the transformer. The pulse width of the discriminator would drift at different times and would not always be together. This would create an interval between the pulses where they did not coincide and could cause the system to function as an integral counter instead of operating the anti-coincidence circuit. The necessity for this pulse width created excessive dead time, that is, up to 1500 microseconds, and limited the counting rate.

While attempts have been made to overcome these problems and to adapt the system to faster counting by reducing the dead time, and by substituting electronic anti-coincidence for the transformer, these efforts have introduced other problems, such as difference in response rates of the different channels set to function at different voltage magnitudes and which adversely effected the operation of the anti-coincidence circuit. Overcoming these problems has tended to increase the dead time of the system. An example of one of these systems may be found on page 235 of Elmore and Sands on Electronics, published by McGraw-Hill Book Company in 1949. Such a system will have a substantial dead time of up to 15 microseconds which would limit its usefulness. This is due to the type of pulse shaping network necessary for that particular type of operation. Further, the use of such a large number of tubes increases costs and reduces reliability of operation.

Applicant with a knowledge of these problems in the prior art has for an object of his invention the provision of a differential-integral pulse height analyzer having a dead time as low as 1 microsecond or less.

Applicant has as another object of his invention the provision of a differential-integral pulse height analyzer which reduces to a minimum or eliminates the need for periodic adjustment.

Applicant has as another object of his invention the provision of a differential-integral pulse height analyzer which overcomes the problem of anti-coincidence circuitry introduced by channels having different response times without increasing the dead time of the system.

Applicant has as a further object of his invention the provision of a differential-integral pulse height analyzer which will respond to various forms of driving pulses and where pulse shape is not critical to the operation of the system within the speed limitations of the circuitry.

Applicant has as a still further object of his invention the provision of a pulse height analyzer having a rate circuit employing an impedance transformer for coupling the integrating circuit to the pulse shaping circuit and reducing the dead time introduced by the usual coupling condenser.

Applicant has as a still further object of his invention the provision of a differential-integral pulse height analyzer having an anti-coincidence circuit where the pulse height of the driving signal passing through it is made independent of and is not affected by the aging of the tubes.

Applicant has as a still further object of his invention the provision of a differential-integral pulse height analyzer having a trigger type anti-coincidence circuit which performs the function of both the trigger circuit and the usual univibrator of the rate meter circuit.

Applicant has as a still further object of his invention the provision of a differential-integral pulse height analyzer where the dead time has been reduced to essentially that of the triggers.

Other objects and advantages of my invention will appear from the following specification and accompanying drawings and the novel features will be particularly pointed out in the annexed claims.

In the drawings, Fig. 1 is a block diagram of the basic elements of a differential-integral pulse height analyzer incorporating the principles of my invention. Figs. 2a and 2b constitute a schematic of the circuit of one form of my improved pulse height analyzer. Fig. 3 is a schematic of the circuit of another form of my improved pulse analyzer. Fig. 4 is a block diagram of my improved pulse height analyzer. Fig. 5 is a graph showing an exaggerated pulse and indicating the differences in the times of operation of the gates of Fig. 1. Fig. 6 is a set of graphs depicting generally the shape and extent of pulses at different points in the system of Fig. 2. Fig. 7 is a set of graphs showing wave shapes at designated points in the system of Fig. 3.

Referring to the basic circuit of Fig. 1, 12 designates the lower gate and 13 represents the upper one. The upper gate is set to operate on pulses of greater magnitude than those which will operate the lower one. The spread between the two gates represents the slit through which the pulses may pass. These gates feed into an anti-coincidence circuit 14 so that pulses large enough to be passed by both gates 12 and 13 will cancel out in the anti-coincidence circuit and no driving pulse will be passed thereby. Pulses sufficiently large to pass through the lower gate 12 but not large enough to reach the threshold of the upper gate 13 will be rejected by it and will only pass through the lower channel and will be passed by the anti-coincidence circuit for counting. Thus pulses falling within the voltage range between the thresholds of gates 12 and 13 will pass through the slit and be counted.

However, for systems with anti-coincidence circuits which are to operate at the higher counting rates, because of the finite rise and fall time of the signal at the input, the lower gate 12 is triggered before the upper gate 13, and the upper gate 13 is also restored to the ground state before the lower gate 12. This is illustrated in Fig. 5 where the lower gate 12 may operate at time $t_1$ while the upper gate 13 is not operated until time $t_2$. Then at time $t_3$ the upper gate 13 is restored and finally at time $t_4$ the lower gate 12 is restored. This may adversely effect the operation of the anti-coincidence circuit due to the fact that the operating time of the two gates does not coincide. Thus it is seen that the inhibiting signal for the anti-coincidence circuit must continue at least as long as the driving or inquiring signal since the overlap would permit the driving signal to pass through the anti-coincidence circuit and register a count. This has been overcome by delaying the signal from the lower gate 12 with a delay circuit 15 until the upper gate 13 has been triggered, and to store the signal from the upper gate 13 in a storage circuit 16 until the lower gate 12 has recovered.

In the above system the gate circuits were considered to be of the Schmitt trigger type where the output pulse is dependent upon the duration of the input pulse. Further, when the pulse width of the amplifier (not shown) feeding the input circuit changes, manual readjustment of the circuit is required if the leading edge of the lower gate is used for the driving signal. Attempts to use the trigger circuit whose output circuit was independent of input signal duration especially where the upper gate produced pulses of greater length than the lower one resulted in spurious operation of the system, particularly where pulses arrived during the time when the inhibiting circuit or upper gate is still operating as the result of the preceding pulse, but the lower gate is already recovered from the effects of the preceding pulse.

Referring now to the block diagram of Fig. 4 the upper and lower gates are designated, respectively, 1 and 2. They feed into anti-coincidence circuit 3 connected to a counting rate meter 4. The gates are biased by voltages of slightly different magnitude. Pulses large enough to trigger both gates are rejected by the anti-coincidence circuit, but those large enough to trigger only the lower gate 2 are passed through to the rate meter 4. To delay the signal from the lower gate 2, a delay line with the receiving end short-circuited 5 is interposed in the output circuit thereof, to differentiate the signal and form two sharp pulses. The pulse produced from the leading edge is a positive pulse while the one from the trailing edge is a negative pulse. These pulses are fed to an inverter amplifier 6 where they are inverted so that the positive pulse now trails the negative pulse. The positive pulse is effective in passing through the anti-coincidence circuit 3 (in the absence of an inhibiting signal). The pulses are also fed from the inverter amplifier 6 into the inverter mixer 8, and undelayed pulses from the gate 2 are likewise fed into the inverter mixer. The output of the inverter mixer is coupled to a clamp 9 which has its output connected to condenser 10 used to store the charge from upper gate 1. Clamp 9 is used to discharge condenser 10 at the proper time in the operating cycle. Therefore elements 8, 9 and 10 constitute the storage circuit.

The positive pulse from the output of gate 2 is fed through circuit 17 to inverter mixer 8, and the resulting negative pulse therefrom is impressed upon the clamp 9 to open it. The opening of the clamp 9 places the cathode follower in a position to charge condenser 10 if there is an inhibiting signal from the upper gate 1. Collapse of the pulse from gate 2 would permit the clamp 9 to again close and remove the charge from condenser 10, except for the action of the delayed sharp positive trailing pulse from the inverter amplifier 6 which is impressed upon inverter mixer 8 and this results in its continued operation. This keeps the inhibiting signal from being removed from the anti-coincidence circuit 3 before the driving signal has expired, and overcomes the possibility of false operation due to the finite rise and fall time of the signal.

Referring now to the circuit of Fig. 2, conventional discriminators of the Schmitt trigger type include tubes 18, 19, and 20, 21. These are placed ahead of the gates 1, 2 to improve the stability and increase the circuit speed. This is accomplished by preventing any pulse output from the gates until the pulse height exceeds the triggering level of the gate. It keeps the lower level signals or noise potentials from altering the impedance of the gates. It also amplifies those signals exceeding the threshold level before they are applied to the trigger circuits. This slit has the effect of reducing the triggering time. The slit width, that is, the difference in threshold potentials of the two discriminators including tubes 18, 19 and 20, 21, is controlled and maintained by means of the potentiometers 22, 23.

The outputs of the upper and lower pulse height selectors or discriminators are connected, respectively, through lines 24, 25 to the upper and lower gates 1, 2. These gates including tubes 26, 27 and 28, 29 are conventional Schmitt triggers. The upper trigger circuit 1 is coupled through a condenser 30 to the control grid of the upper half of a duo-triode 31 which acts as a cathode follower, having its cathode connected to the anode of the lower half of said duo-triode, so that it acts as a clamp. Grid resistors 32, 33 serve to couple a large negative bias to the control grid of the cathode follower. This bias is used to prevent the cathode follower from passing an inhibiting signal when it is desired to use the pulse height analyzer for integral counting. The switch 34 serves to remove this bias when it is desired to make differential counts. The cathode of the upper section of tube 31 is connected to charge a small capacitor 10 of about 10 mmf. The cathode of the lower section of tube 31, that is, the clamp, is grounded. The control grid of the lower section of tube 31 is normally maintained at a positive potential through a coupling resistor 36 from B+. It is also coupled through condenser 37 to the output of the duo-triode 38 in the inverter 8.

Storage condenser 10 is coupled through D. C. isolating condensers 39, 39' to the grid resistor 40 of the left section of duo-triode 35, across which is shunted a germanium rectifier 41. A voltage divider including series connected resistors 42, 43 and 44 serve to normally impress a positive potential at the lower end of the resistor 40 to keep the left half of the duo-triode anti-coincidence tube conducting, since the control grid of the right half of this tube is biased to a lower positive potential by being connected to the upper end of resistor 44. This voltage divider receives its positive potential from B+ since it is connected at the upper end to B+ and at the lower end to ground.

The lower gate 2 is coupled through a coupling condenser 46 to a shorted delay line 5 and to the control grid of pentode 47 of the inverter amplifier 6. Resistors 48, 49 serve to connect the plate and screen grid of the tube to B+. The output of tube 47 is connected to the control grid of the right section of anti-coincidence tube 35 through coupling condenser 50. It is also connected through conventional resistance-capacitance coupling to the control grid of the left section of duo-triode tube 38. Duo-triode tube 38 has its cathode 8 grounded through a common cathode resistor 51 and the right hand section has its control grid coupled through conventional resistance-capacitance coupling to the output of gate 2. The plates of both sections of tube 38 are tied together and coupled to B+ through a load resistor 52.

The output of the right section of tube 35 feeds into a conventional univibrator 53 of the count rate meter 4. However instead of the usual practice of charging the integrator circuit 55 directly from the univibrator 53 through a coupling condenser, as shown on page 254 of Sands et al., supra, where the coupling condenser has been made relatively large to extend the range of the counter to low counting rates, applicant has interposed an impedance transformer in the form of a cathode follower 56 between the univibrator 53 and the coupling condenser bank 54. In this arrangement, the cathode follower is employed to transfer from a high impedance to a low impedance. This is important in reducing dead time in the univibrator circuit, since pulse width must be at least three times RC, where C is the capacitance of the coupling condenser, and R is the source impedance of the driving stage, if the ratemeter calibration is to be independent of the driving pulse width. Use of the cathode follower 56 reduces the impedance of the driving stage by substituting the impedance of the cathode follower for that of the univibrator, and cuts down the dead time in the univibrator. This arrangement can be used to cut the dead time by a factor of up to one thousand. From the coupling condenser bank 54 the signal is fed through duo-diode 57 to integrator 55 and then into the vacuum tube voltmeter 58 which feeds the recorder 59.

The operation of the system commences with a pulse appearing at $a$ from some pulse source such as a radiation counter and its amplifier. The general shape of this pulse appears as graph $a$ in Fig. 6. If the pulse is of sufficient magnitude to operate the lower pulse height selector circuit, represented by tubes 20, 21, but not of sufficient magnitude to operate the upper pulse height selector, represented by tubes 18, 19, it only passes through lead 25 to the lower gate 2. If it is of sufficient magnitude to operate the trigger 28, 29 of the lower gate 2, the resulting rectangular pulse, as indicated by graph $c$ in Fig. 6, is coupled into shorted delay line 5 which differentiates the pulse since the reflected signal is out of phase with the incoming one. This action creates sharp positive and negative pulses as indicated by graph $d$ in Fig. 6. These pulses are then fed to the inverter tube 47 where their polarity is reversed, and the positive pulse appears at the tail of the originating pulse from gate 2, as indicated in graph $e$ of Fig. 6. This sharp positive pulse renders the right section of the cathode coupled coincidence circuit 35 operative and passes a driving pulse through to the rate meter 4 which operates in the conventional way to record or indicate the pulse.

However, if the magnitude of the signal at $a$ is sufficiently great to operate both the upper and the lower pulse height selectors, represented respectively by tubes 18, 19 and 20, 21, pulses will be passed through the leads 24, and 25 to the upper and lower gates 1, 2. The pulse from the upper gate 1 appearing at point b is shown in graph b of Fig. 6. The pulse from the lower gate 2 appearing at point c is shown in the graph c of Fig. 6. This latter pulse is applied to the control grid of the right section of tube 38 and produces a negative pulse on the plate of that section of the tube. This is coupled through a coupling condenser 37 to the control grid of the normally conducting lower section of tube 31 to cause it to cease conduction, thereby opening the clamp and permitting the signal from point b to charge the condenser 10 at point g as it passes through the upper section of tube 31. The shape of the signal at point g is indicated in graph g of Fig. 6. This same signal is coupled through the condenser 39. Condenser 39 charges as the result of feeding this asymmetrical signal into it and alters the bias on the control grid of the left section of tube 35. The diode 41 tends to keep the base line at a constant point by removing the charge from condenser 39 after each pulse. This problem, however, does not occur in connection with the signal fed into the right section of tube 35, since it is a differentiated signal and is already symmetrical with respect to the base line. Condenser 39' serves as a by-pass condenser to prevent undesirable coupling between various points of the resistor network 42, 43, 44.

The inhibiting signal from the gate 1 upon reaching the control grid of the left section of tube 35 is in opposition to the action of the driving signal reaching the control grid of the opposite section of the tube. This maintains the conduction of the left section of the tube 35 and prevents the driving signal from being passed on through the tube to the rate meter 4.

However, to prevent the inhibiting signal from dying out before the driving signal, the differentiated pulse applied to the control grid of the right section of the tube 35 through inverter amplifier 47 is likewise applied to the control grid of the left section of tube 38, employing the trailing positive differentiated pulse to produce a negative signal on the plate of that section of tube 38 which is coupled through condenser 37 to the control grid of the lower section of tube 31, and this maintains the clamp open even after the collapse of the signal from the right section of tube 38. That sustains the inhibiting signal stored on condenser 10 and maintains the operation of the left section of tube 35 while the driving signal is applied to the other section of this tube. Thereafter, collapse of the signal from the left section of tube 38 permits the control grid of the lower section of tube 31 to go positive, plus closing the clamp and removing the charge from the condenser 10 to ground through the lower conducting section of that tube.

Since the analyzer is intended to be used with a recorder, it is desirable to have the recorder shut off automatically after a curve has been completed. Such a convenience feature is provided by circuit 90. Tubes 91 and 92 are connected as a Schmitt trigger circuit. The input lead 98 is connected to the point which determines the threshold level for the discriminator circuits. Potentiometer 93 determines the triggering level for circuit 90. Adjustments 94 and 95 serve to make the dial of the automatic shut-off circuit correspond to that of the pulse-height selector dial. When the recorder causes the pulse height selector control to turn to the same relative position as that to which the automatic shut-off control has been set, the trigger circuit operates, causing the relay 96 to operate, and turning off the recorder.

The modification of Fig. 3 is similar to that disclosed in Fig. 2 except for certain changes which result in economy of tubes and components and will be specifically pointed out hereinafter. The initial pulse height selectors have been omitted and such compensation against the adverse effects of below threshold pulses have been realized by coupling neutralizing pulses into the cathode circuits of the upper and lower gates 1', 2' from the preceding amplifier which may be employed in amplifying pulses from the pulse source. Such an amplifier is described by W. H. Jordan and P. R. Bell in Rev. Sci. Inst., 18, 703 (1947). Since the neutralizing pulse required is a negative signal of the same shape and magnitude as the positive pulse, it can be secured from a gain-of-one phase inverter whose signal is derived from the same source as that driving the grids of tubes 26 and 28. Thus for purposes of illustration, tubes 60 and 61 of the A-1 amplifier have been included. The output tube 61 has been connected as such a phase inverter. The anode of tube 61 is coupled through condensers 62, 62 to the cathode of the tubes 26', 27' and 28', 29' of the gates 1', 2', while the cathode of this tube is connected to the inputs of these gates. The 404A tubes which have a lower grid to cathode capacitance than the tubes in the previously described modification aid the reduction of the spurious signals.

Gates 1', 2' are preferably modified Schmitt triggers in that a form of inductance compensation is provided by including inductances 63, 63 in the anode circuits of tubes 26', 28'. These inductances are shunted by resistors 64, 64 which correspond to their critical resistance value to prevent transient oscillation noise known as ringing. The inductance compensation is much more than critical, the resulting pulse overshoot being purposely intended. With this arrangement it is possible to realize more sensitivity with a slight sacrifice in dead time. Dead time, however, would only be of the order of 0.8 microsecond. Without this over compensation, it would not be possible to eliminate the tubes 18, 19, 20 and 21 of Fig. 2. For very narrow pulses the circuit is not a true Schmitt, since output pulse width is not independent of driving pulse width. For a positive pulse imposed upon the gate 2' of the form indicated generally by the graph a' of Fig. 7, the output pulses of the gates 1', 2' at point b', and b'' are represented by waves designated b', b'' in Fig. 7. Appropriate bias for these gates is supplied by voltage divider network 22' similar to that employed in the system of Fig. 2 to supply bias for the pulse height selector.

The output of gate 2' is coupled through resistance-capacitance coupling to tube 65 which acts both as a phase inverter and a cathode follower. This tube has its cathode grounded through a cathode resistor 66 and in addition has the cathode coupled through resistor 67 to a shorted delay line 68 which differentiates the signal therefrom before application through coupling condenser 69 and diode 70 to the control grid of the right section of duo-triode 35' which forms a part of the anti-coincidence circuit. The operation of this tube differs, however, from the cathode coupled anti-coincidence tube of the preceding circuit, since the present one is operated as a univibrator. The form of the differentiated signal at d' is shown in the graph of Fig. 7 and identified as d'.

The anode of tube 65 is connected to B+ through a load resistor 71 and is connected to an open ended delay line 72 which puts a notch in the pulse as indicated by the graph labeled h in Fig. 7. It will be understood that signals leaving an open ended delay line are in phase with those entering it, and that the lower portion of the leading edge of the pulse is unaffected by the action of the delay line while the upper section thereof is displaced. The reverse is true of the trailing edge of the pulse. This has the effect of prolonging or stretching the pulse, and performs the function previously carried out by the phase inverter mixer of the modification of Fig. 2.

Delay line 72 feeds into the lower section of a double diode 31', the upper section of which is coupled to a phase inverter 73 fed by the upper gate 1'. It is thus seen that the cathode follower and clamp of the preceding system has been replaced by a double diode. However, two germanium diodes may be employed for this purpose. The cathode of tube 73 is coupled to ground through resistor 74, 75 while both the anode and cathode are coupled to B+ through resistors 76, 77. As in Fig. 2, the switch 34' serves to connect the analyzer as either an integral counter or differential counter by altering the grid bias of coupling tube 73. The two sections of the duo-diode 31' are connected together and the lower one functions as a clamp maintaining the charge which has been stored on the condenser 10' through the upper section of the tube. Storage condenser 10' is coupled through condenser 79 to the control grid of the left section of the duo-triode 35'. Cathodes and duo-triode 35' are grounded through common cathode resistor 80 while the two anodes are coupled to B+ through load resistors 81, 82. The other coupling elements 83, 84, 85, 86, 87 and 88 complete the trigger circuit.

In this arrangement a positive driving pulse passing through the tube 65 and its cathode follower coupling to the delay line 68 is not inverted, but after differentiation results in a sharp leading positive pulse and a sharp trailing negative pulse. The positive pulse cannot trigger tube 35' but the negative pulse will, in the absence of an inhibiting pulse from gate 1'. The negative pulse applied to the grid of the right-hand part of tube 35' initiates the triggering action by causing the conduction of this part to decrease. Because of the positive feed back existing by virtue of the coupling condenser 83 and cathode resistor 80, the two valves of tube 35' complete the triggering action. Diode 70 serves to disconnect the right-hand grid from the driving signal at $d'$ while the tube 35' is in the triggered state. This makes the duration of the triggered state independent of the duration or amplitude of the triggering signal from $d'$. The positive pulse produced by the right section of the coincidence circuit is coupled through conventional resistance-capacitance coupling to duo-triode 89 which serves as a cathode follower for coupling the integrating circuit of a counting rate meter or scaler to the system. A duo-triode is used to provide more signal power than a single triode can. It will be noted that by connecting the anti-coincidence circuit as a univibrator, it is possible to dispense with the usual univibrator of the rate meter circuit, and reduce the number of tubes required.

If the pulse which triggers the lower gate 2' is of sufficient magnitude to also trigger the upper gate 1', there will be positive pulses in both channels. The positive pulse from the upper channel gate 1' is inverted by tube 73 and is applied to the cathode of the upper section of duo-diode 31'. If the lower section of this tube, which acts as a clamp were closed, little charge could build up on condenser 10'. However, this is taken care of by inverting the driving pulse from gate 2' in tube 65, and after stretching it with delay line 72, applying the resulting negative signal to the anode of the lower section of tube 31' causing the clamp to cease conducting and remain open. This permits the negative inhibiting pulse originating at gate 1' to build a charge on the condenser 10' through the upper section of tube 31'. This pulse is also applied through the coupling condenser to the control grid of the left section of the anti-coincidence tube 35'. The shape of this pulse at $g'$ is shown by the graph $g'$ of Fig. 7. This pulse will prevent the triggering of the tube 35' and will thus block the signal to the counting circuit, thereby preventing false operation.

Having thus described my invention, I claim:

1. A pulse analyzer for determining pulse height distribution comprising a pair of channels fed from a common source of pulses, a pulse height discriminator positioned in each channel, the discriminator of one of said channels operating at a higher threshold potential than the discriminator of the other of said channels, means for storing the pulses passing through said first named channel, means for delaying the pulses passing through said other channel, clamp means responsive to signals from said other channel for removing the stored pulses from said storing means, and an anti-coincidence circuit for combining the pulses from said channels in opposition.

2. A pulse analyzer for determining pulse height distribution comprising a pair of channels fed from a common signal source, a gate in each channel for passing pulses of predetermined magnitude, the gate in one channel having a higher signal acceptance value than the gate in the other channel, a storage circuit in said first named channel for storing pulses passing therethrough, a differentiating network for differentiating the pulses passing through the other channel, a clamp responsive to signals from the other channel for removing the stored pulses from the storage circuit, and an anti-coincidence circuit for combining the pulses from said channels in opposition.

3. A pulse analyzer for determining pulse height distribution comprising a pair of channels fed from a common signal source, a gate positioned in each of said channels for passing pulses of predetermined magnitude, the gate in one of said channels rejecting signals of lower magnitude than the gate in the other of said channels, a storage circuit fed by pulses passing through the first of said channels, a differentiating network positioned in the other of said channels for differentiating pulses passing therethrough, an inverter fed by the delay line, a clamp responsive to signals in the other of said channels to provide a low impedance path to ground from the storage circuit for controlling its operation, and an anti-coincidence circuit for combining pulses from said channels in opposition.

4. A pulse analyzer for determining pulse height distribution comprising a pair of channels fed from a common signal source, a gate in each of said channels for passing pulses above a predetermined magnitude, the gate in one of said channels having a higher acceptance value than the gate in the other of said channels, a storage circuit fed by one of said channels, a differentiating network in the other of said channels for differentiating pulses passing therethrough, a clamp for controlling the duration of storage of the storage circuit, an inverter mixer responsive to signals for the other of said channels for opening said clamp, and an anti-coincidence circuit for combining the pulses from said channels in opposition.

5. A pulse analyzer for determining pulse height distribution comprising a pair of channels fed from a common signal source, a gate in each of said channels for passing pulses above a predetermined magnitude, the gate in one of said channels having a higher acceptance value than the gate in the other of said channels, a storage circuit in the first named channels for storing pulses, a differentiating network in the other of said channels for differentiating pulses passing therethrough, a clamp responsive to signals in the other of said channels for controlling the duration of storage of said pulses by said storage circuit, an inverter mixer fed from the other of said channels for opening said clamp, an inverter coupled to said delay line, and an anti-coincidence circuit for combining the pulses from the storage circuit and inverter in opposition.

6. A pulse analyzer for determining pulse height distribution comprising a pair of channels fed from a common signal source, a gate in each of said channels for passing pulses above a predetermined magnitude, the gate in one of said channels having a higher acceptance value than the gate in the other of said channels, a storage circuit in said one of said channels for storing pulses, a differentiating network in the other of said channels for differentiating the pulses passing therethrough, an inverter coupled to the delay line for inverting the differentiated pulses, a clamp responsive to signals from the other of said channels for completing a circuit to remove pulses from the storage circuit, an inverter mixer coupled to the gate in said other channel and to said inverter for opening the clamp and maintaining it open, and an anti-coincidence circuit for combining the pulses from the storage circuit and the inverter in opposition.

References Cited in the file of this patent

UNITED STATES PATENTS

| Number | Name | Date |
| --- | --- | --- |
| 2,529,666 | Sands | Nov. 14, 1950 |
| 2,534,264 | Hoeppner | Dec. 19, 1950 |
| 2,551,529 | Davis et al. | May 1, 1951 |
| 2,577,147 | Oberman et al. | Dec. 4, 1951 |
| 2,577,475 | Miller | Dec. 4, 1951 |
| 2,646,501 | Eckert | July 21, 1953 |
| 2,648,766 | Eberhard | Aug. 11, 1953 |